(12) United States Patent
Murray et al.

(10) Patent No.: US 11,396,153 B2
(45) Date of Patent: Jul. 26, 2022

(54) METHODS FOR THERMAL WELDING OF WIND TURBINE BLADES

(71) Applicant: Alliance for Sustainable Energy, LLC, Golden, CO (US)

(72) Inventors: Robynne E. Murray, Superior, CO (US); Joseph Owen Roberts, Broomfield, CO (US); Ryan Andrew Beach, Westminster, CO (US); Jason Markos Roadman, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 337 days.

(21) Appl. No.: 16/701,929

(22) Filed: Dec. 3, 2019

(65) Prior Publication Data

US 2020/0171768 A1 Jun. 4, 2020

Related U.S. Application Data

(60) Provisional application No. 62/774,388, filed on Dec. 3, 2018.

(51) Int. Cl.
*F03D 1/06* (2006.01)
*B29D 99/00* (2010.01)
*B29L 31/08* (2006.01)

(52) U.S. Cl.
CPC ....... *B29D 99/0025* (2013.01); *F03D 1/0675* (2013.01); *B29L 2031/085* (2013.01)

(58) Field of Classification Search
CPC .... F03D 1/0633; F03D 1/0641; F03D 1/0675; F03D 1/0683; B29D 99/0025; B29D 99/0028; B29L 2031/085
See application file for complete search history.

(56) References Cited

U.S. PATENT DOCUMENTS

| | | | |
|---|---|---|---|
| 4,120,712 | A | 10/1978 | Sindt |
| 4,673,450 | A | 6/1987 | Burke |
| 5,313,034 | A | 5/1994 | Grimm et al. |
| 5,530,227 | A | 6/1996 | Matsen et al. |
| 5,587,098 | A | 12/1996 | Matsen et al. |
| 5,599,472 | A | 2/1997 | Brown et al. |

(Continued)

FOREIGN PATENT DOCUMENTS

| | | |
|---|---|---|
| GB | 2463250 A | 9/2008 |
| WO | 1996039326 A1 | 12/1996 |

(Continued)

OTHER PUBLICATIONS

International Search Report and Written Opinion for International (PCT) Application PCT/US19/64230, dated Apr. 2, 2020, pp. 1-8.

(Continued)

*Primary Examiner* — Courtney D Heinle
*Assistant Examiner* — Sang K Kim
(74) *Attorney, Agent, or Firm* — Alexandra M. Hall

(57) ABSTRACT

Disclosed herein are methods, devices, and systems for manufacturing wind turbine blades which in some instances require using new blade joint designs. The blade joint designs described herein may allow for contact in places where welds will be made, which allows for existing manufacturing tolerances to be used while still enabling the use of thermal welding for wind turbine blades.

10 Claims, 6 Drawing Sheets

(56) References Cited

U.S. PATENT DOCUMENTS

| | | | |
|---|---|---|---|
| 5,705,794 | A | 1/1998 | Gillespie et al. |
| 5,717,191 | A | 2/1998 | Christensen et al. |
| 5,723,849 | A | 3/1998 | Matsen et al. |
| 5,728,309 | A | 3/1998 | Matsen et al. |
| 5,916,469 | A | 6/1999 | Scoles et al. |
| 5,935,475 | A | 8/1999 | Scoles et al. |
| 6,009,925 | A | 1/2000 | Hall et al. |
| 6,043,469 | A | 3/2000 | Fink et al. |
| 6,056,844 | A | 5/2000 | Guiles et al. |
| 6,284,089 | B1 | 9/2001 | Anderson et al. |
| 6,323,468 | B1 | 11/2001 | Dabelstein et al. |
| 6,528,771 | B1 | 3/2003 | Matsen et al. |
| 6,566,635 | B1 | 5/2003 | Matsen et al. |
| 6,939,477 | B2 | 9/2005 | Stark et al. |
| 10,151,297 | B2* | 12/2018 | Caruso .............. B29C 66/73921 |
| 10,213,994 | B2 | 2/2019 | Tobin et al. |
| 10,422,315 | B2* | 9/2019 | Yarbrough ............ F03D 1/0675 |
| 2007/0036659 | A1 | 2/2007 | Hibbard |
| 2010/0062238 | A1 | 3/2010 | Doyle et al. |
| 2010/0065552 | A1 | 3/2010 | Matsen et al. |
| 2012/0024457 | A1 | 2/2012 | Ramm et al. |
| 2012/0145703 | A1 | 6/2012 | Matsen et al. |
| 2012/0291948 | A1 | 11/2012 | Matsen et al. |
| 2013/0075025 | A1* | 3/2013 | Guitton ................. B29C 33/485 156/245 |
| 2013/0149501 | A1 | 6/2013 | Pacchione et al. |
| 2013/0164133 | A1 | 6/2013 | Grove-Nielsen et al. |
| 2017/0074240 | A1 | 3/2017 | Caruso et al. |
| 2019/0136833 | A1 | 5/2019 | Broome et al. |
| 2019/0358911 | A1* | 11/2019 | Hedges ................. B29C 66/961 |

FOREIGN PATENT DOCUMENTS

| | | | |
|---|---|---|---|
| WO | 2001085827 | A2 | 11/2001 |
| WO | 2015009364 | A1 | 1/2015 |
| WO | 2018130257 | A1 | 7/2018 |

OTHER PUBLICATIONS

Joncas, "Thermoplastic Composite Wind Turbine Blades. An Integrated Approach", Thesis Université du Quebéc, Canada, Jul. 2010, pp. 1-272.

Murray et al., "Manufacturing a 9-Meter Thermoplastic Composite Wind Tubine Blade", Presented at the American Society for Composites, 32nd Technical Conference, pp. 1-18.

"Induction Heating Applications", ANSYS, Inc, 2013, available at https://www.ansys.com/-/media/ansys/corporate/resourcelibrary/techbrief/ab-induction-heating-applications.pdfla=en&hash=72F8DBA60AF98A13689DA21AE4874FDA5BE02FF0, pp. 1-3.

Ageorges et al., "Experimental investigation of the resistance welding for thermoplastic-matrix composites. Part I: heating element and heat transfer", Composites Science and Technology, 2000, vol. 60, pp. 1027-1039.

Ageorges et al., "Experimental investigation of the resistance welding of thermoplastic-matrix composites. Part II: optimum processing window and mechanical performance", Composites Science and Technology, 2000, vol. 60, pp. 1191-1202.

Ageorges et al., "Advances in fusion bonding techniques for joining thermoplastic matrix composites: A review", Composites: Part A, 2001, vol. 32, pp. 839-857.

Ageorges et al., "Resistance welding of thermosetting composite/thermoplastic composite joints", Composites: Part A, 2001, vol. 32, pp. 1603-1612.

Ahmed et al., "Induction welding of thermoplastic composites—an overview", Composites Part A: Applied Science and Manufacturing, 2006, vol. 37, No. 10, pp. 1638-1651.

Anderson et al., "Bladder Assisted Composite Manufacturing (BACM): Challenges and Opportunities", Polymer Processing Society Europe-Africa Conference, At Tel Aviv, Israel, Conference Paper, Oct. 2014, pp. 1-3.

Bayerl et al., "The heating of polymer composites by electromagnetic induction—A review". Composites Part A: Applied Science and Manufacturing, 2014, vol. 57, pp. 27-40.

Castelos et al., "On the impact of multi-axial stress states on trailing edge bondlines in wind turbine rotor blades", Journal of Physics: Conference Series—The Science of Making Torque from Wind (Torque 2016), 2016, vol. 753, No. 062002, pp. 1-10.

Chaboudez et al., "Numerical Modeling in Induction Heating for Axisymmetric Geometrics", IEEE Transactions on Magnetics, Jan. 1997, vol. 33, No. 1, pp. 739-745.

Dubé, "Static and Fatigue Behavior of Thermoplastic Composite Laminates Joined by Resistance Welding", A Thesis Submitted to McGill University in Partial Fulfillment of the Requirements of the Degree of Philosophiae Doctor, Sep. 2007, pp. 1-194.

Dubé, "Characterization of resistance-welded thermoplastic composite double-lap joints under static and fatigue loading", Journal of Thermoplastic Composite Materials, 2015, vol. 28, No. 6, pp. 762-776.

Fernandez et al., "Subcomponent development for sandwich composite wind turbine blade bonded joints analysis", Composite Structures, 2017, vol. 180, pp. 41-62.

Gardiner, "Welding thermoplastic composites", 2018, Available from: https://www.compositesworld.com/articles/welding-thermoplastic-composites, Accessed Feb. 10, 2020, pp. 1-12.

Holmes et al., "Thermal Analysis for Resistance Welding of Large-Scale Thermoplastic Composite Joints", Journal of Reinforced Plastics and Composites, Jun. 1993, vol. 12, pp. 723-737.

Hou et al., "Resistance welding of carbon fibre reinforced thermoplastic composite using alternative heating element", Composite Structures, 1999, vol. 47, Nos. 1-4, pp. 667-672.

Hua et al., "Elastic-plastic analysis and strength evaluation of adhesive joints in wind turbine blades", Composites: Part B, 2013, vol. 44, pp. 650-656.

Knapp et al., "Laser-bonding of long fiber thermoplastic compositesfor structural assemblies", Physics Procedia 5, 2010, pp. 163-171.

Knauf et al., "Low frequency induction heating for the sealing of plastic microfluidic systems", Microfluid Nanofluid, 2010, vol. 9, pp. 243-252.

Lundström et al., "Induction heating of carbon fiber composites: Investigation of electrical and thermal properties", International Journal of Applied Electromagnetics and Mechanics, 2017, vol. 53, pp. S21-S30.

Matsen et al., "Induction Consolidation/Molding of Thermoplastic Composites Using Smart Susceptors", Final Technical Report—Boeing, Jun. 2012, pp. 1-81.

Mattheß et al., "Inductive heating of glass fibre-reinforced thermoplastics using fibre- and wire-shaped stainless steel susceptors", Journal of Thermoplastic Composite Materials, 2017, vol. 30, No. 1, pp. 67-97.

McKnight et al., "Scaling Issues in Resistance-Welded Thermoplastic Composite Joints", Advances in Polymer Technology, 1997, vol. 16, No. 4, pp. 279-295.

Miller, "Predictive capabilities of an induction heating model for complex-shape graphite fiber/polymer matrix composites", 24th International Sample Technical Conference, Oct. 1992, pp. 1-15.

Moser, "Experimental Analysis and Modeling of Susceptorless Induction Welding of High Performance Thermoplastic Polymer Composites", Dissertation from the Department of Mechanical and Process Engineering at the Technical University of Kasierslautern, May 2012, pp. 1-135.

Murray et al., "Fusion joining of thermoplastic composite wind turbine blades: Lap-shear bond characterization", Renewable Energy, 2019, vol. 140, pp. 501-512.

O'Shaughnessey et al., "Modeling and experimental investigation of induction welding of thermoplastic composites and comparison with other welding processes", Journal of Composite Materials, 2016, vol. 50, No. 21, pp. 2895-2910.

Panneerselvam et al., "Study on resistance welding of glass fiber reinforced thermoplastic composites", Materials and Design, 2012, vol. 41, pp. 453-459.

Rudolf et al., "Induction heating of continuous carbon-fibre-reinforced thermoplastics", Composites: Part A, 2000, vol. 31, pp. 1191-1202.

(56) References Cited

OTHER PUBLICATIONS

Shevchenko et al., "Rapid Automated Induction Lamination (RAIL) for High-Volume Production of Carbon/Thermoplastic Laminates", Army Research Laboratory, ARL-TR-2478, May 2001, pp. 1-48.

Shi, "Resistance welding of thermoplastic composites Process and performance", Thesis to obtain the degree of doctor at the Delft University of Technology, Nov. 2014, pp. 1-156.

Smith et al., "Bondline Temperature Control for Joining Composites With an Embedded Heater", Journal of Manufacturing Science and Engineering, Feb. 2016, vol. 138, pp. 021011-1-021011-9.

Stavrov et al., "Resistance welding of thermoplastic composites—an overview", Composites Part A: Applied Science and Manufacturing, 2005, vol. 36, pp. 39-54.

Stokes, "Joining Methods for Plastics and Plastic Composites: An Overview", Polymer Engineering and Science, Oct. 1989, vol. 29, No. 19, pp. 1311-1324.

Stokes, "Experiments on the Induction Welding of Thermoplastics", Polymer Engineering and Science, Sep. 2003, vol. 43, No. 9, pp. 1523-1541.

Van Moorleghem, "Welding of thermoplastic to thermoset composites through a thermoplastic interlayer", TU Delft, Thesis in partial fulfilment of the requirements for the degree of Master of Science, Aerospace Engineering, Jun. 2016, pp. 1-67.

Wang et al., "Characterization of weld attributes in ultrasonic welding of short carbon fiber reinforced thermoplastic composites", Journal of Manufacturing Processes, 2017, vol. 29, pp. 124-132.

Wise et al., "Microwave welding of thermoplastics", Journal of Materials Science, 2001, vol. 36, pp. 5935-5954.

Ye et al., "Fusion Bonding of Thermoplastic Composite with Dissimilar Materials", Conference Proceeding, 2001, pp. 1-9.

Yousefpour et al., "Fusion Bonding/Welding of Thermoplastic Composites", Journal of Thermoplastic Composite Materials, Jul. 2004, vol. 17, pp. 303-341.

Zammar et al., "Intelligent Thermal Control of Resistance Welding of Fiberglass Laminates for Automated Manufacturing", IEEE/ASME Transactions of Mechatronics, Jun. 2015, vol. 20, No. 3, pp. 1069-1078.

Zhang, "Numerical modeling of induction assisted subsurface heating technology", Thesis—Worcester Polytechnic Institute, Feb. 2012, pp. 1-58.

* cited by examiner

METHODS FOR THERMAL WELDING OF WIND TURBINE BLADES

CROSS-REFERENCE TO RELATED APPLICATIONS

This application claims the benefit of U.S. Provisional Application No. 62/774,388 filed on Dec. 3, 2018, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Wind turbine blades are commonly manufactured in multiple pieces of glass and/or carbon fibers and bonded together with an adhesive, which may be a thermoset resin such as epoxy. As shown in FIG. 1, the high- and low-pressure skins of the blade are bonded together to form the aerodynamic shell of the blade 100. The shear web 105 supports the high pressure skin 110 and low pressure skin 115 while resisting buckling and transferring shear loads. The spar caps 120a and 120b are the main load-carrying support along the blade span. The leading-edge bond 125 and trailing edge bond 130 are the locations where the high-pressure skin 110 and low-pressure skin 115 are joined together. In traditional wind turbine blades 300, these bonds are adhesive.

The spar caps 120a and 120b are typically manufactured as part of the skins (110 and 115). The joints between the spar caps 120a and 120b and the shear web 105 are adhesive (shown with upper adhesive 135a and lower adhesive 135b) The adhesives in wind turbine blade joints typically range from 5 mm to 20 mm in thickness, with material properties varying as a function of adhesive thickness.

SUMMARY

An aspect of the present disclosure is a system which includes a first wind turbine blade skin having a first spar cap, a shear web, a first heating element and a second heating element, and a first flange having a first end and a second end, wherein the first heating element is positioned between the first end and the shear web, and the second heating element is positioned between the second end and the first spar cap. In some embodiments, the first spar cap, the shear web, and the first flange are comprised of a thermoplastic resin. In some embodiments, the first end is configured to be welded to the shear web creating a first bond, with the first heating element contained within the first bond, and the second end is configured to be welded to the first spar cap creating a second bond, with the second heating element contained within the second bond. In some embodiments, the system also includes a second wind turbine blade skin having a second spar cap, a third heating element and a fourth heating element, and a second flange having a third end and a fourth end, wherein the third heating element is positioned between the third end and the shear web, the fourth heating element is positioned between the fourth end and the second spar cap, and a pressure is applied to both the third end and the fourth end. In some embodiments, the first spar cap, the second spar cap, the shear web, the first flange, and the second flange are comprised of a thermoplastic resin. In some embodiments, the third end is configured to be welded to the shear web creating a third bond, with the third heating element contained within the third bond, and the fourth end is configured to be welded to the second spar cap creating a fourth bond, with the fourth heating element contained within the fourth bond.

Another aspect of the present disclosure is a method including assembling a wind turbine blade, with the blade including a first skin having a first spar cap, a second skin having a second spar cap, a shear web positioned between the first spar cap and the second spar cap, a first flange having a first end and a second end, positioned with the first end in contact with the shear web forming a first bond, and the second end in contact with the first spar cap forming a second bond, a second flange having a third end and a fourth end, positioned with the third end in contact with the shear web forming a third bond, and the fourth end in contact with the second spar cap forming a fourth bond, and a plurality of heating elements positioned within the first bond, the second bond, the third bond, and the fourth bond, applying a pressure to the first bond, the second bond, the third bond, and the fourth bond, activating the plurality of heating elements, and cooling the wind turbine blade while maintaining the pressure. In some embodiments, the applying a pressure is performed using a bladder positioned within the wind turbine blade. In some embodiments, the first spar cap, the second spar cap, the shear web, the first flange, and the second flange are comprised of thermoplastic resin. In some embodiments, the plurality of heating elements are conductive cables which are connected to a power source. In some embodiments, the activating the plurality of heating elements comprises turning on the power source so electrical energy flows through the heating elements. In some embodiments, the plurality of heating elements is magnetically susceptible. In some embodiments, the activating the plurality of heating elements comprises using a coil to produce a magnetic field which stimulates the plurality of heating elements.

BRIEF DESCRIPTION OF THE DRAWINGS

Exemplary embodiments are illustrated in referenced figures in the drawings. It is intended that the embodiments and figures disclosed herein are considered to be illustrative rather than limiting.

DETAILED DESCRIPTION

Figure 1:
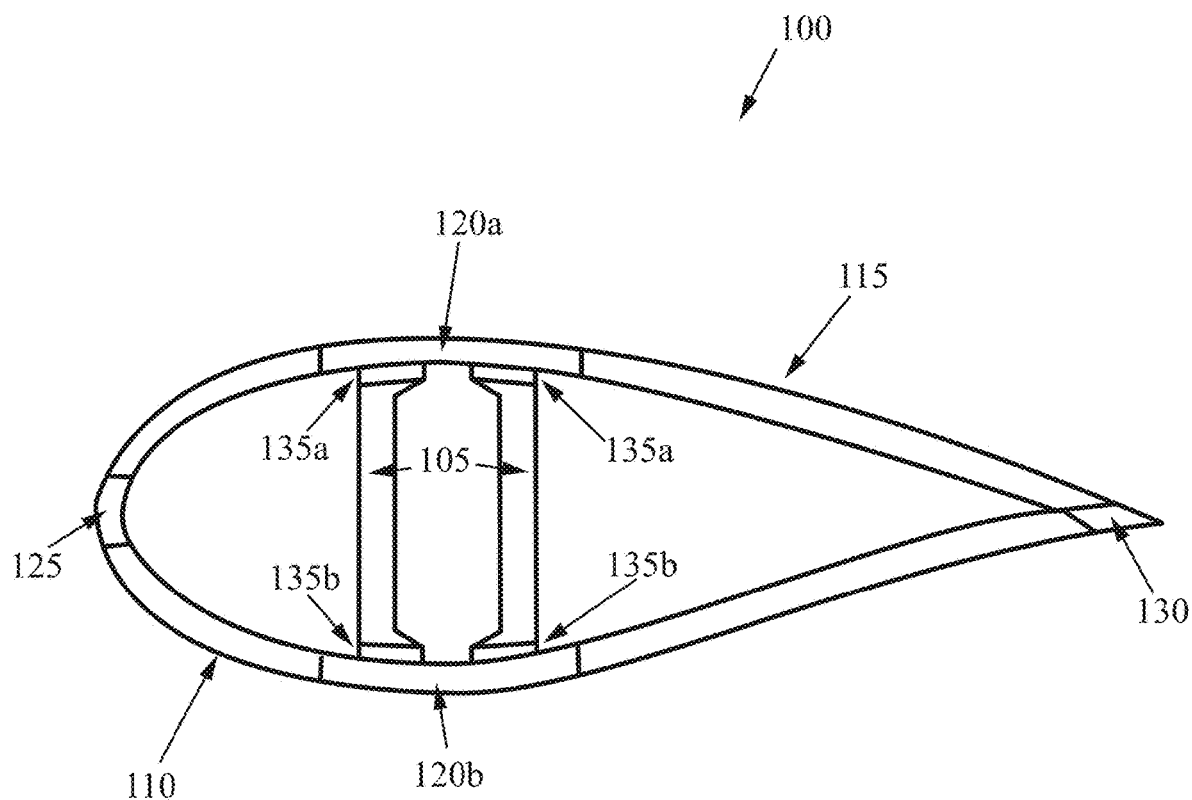
FIG. 1 illustrates a cross-section view of the interior of a prior art wind turbine blade.

Disclosed herein are methods, devices, and systems for manufacturing wind turbine blades using thermal welding as well as thermally welded wind turbine blades, which in some instances include new blade joint designs. The blade joint designs described herein may allow the skins of blades to be welded together without requiring a tightening of blade tolerances. For example, bonding brackets may be positioned between the skin and shear web of a wind turbine blade and may be melted to adhere The methods and designs described herein allow wind turbine blade components to be manufactured of thermoplastic resin. As an example, the blade joint designs described herein may allow for contact in places where welds will be made, which allows for existing manufacturing tolerances to be used while still enabling the use of thermal welding for wind turbine blades.

Over the life span of a wind turbine, blades are exposed to static and cyclic fatigue loads in varying environmental conditions that can cause cracking and/or debonding of the adhesive joints, leading to blade structural collapse. The use of adhesives to bond wind turbine blades is a time consuming in mold process during blade manufacturing. It may take as long as 30 minutes for paste application and 3-4 hours for the curing cycle. This affects blade cycle time and makes the blades very expensive to manufacture. The methods and systems described herein may decrease manufacturing time.

The adhesive bond line in wind turbines fail because of initiation and propagation of cracks in adhesives. There are three primary types of failures. Adhesive/adherent failure (interfacial failure) is characterized by the failure between the adhesive and the adherent surface. Such failure indicates the adhesive was not bonded well to the adherends. Cohesive failure is characterized by the failure within the adhesive, typically through its thickness. This type of failure suggests that the bond between the adherends and the adhesive is stronger than the adhesive strength itself. Adherent failure (coupon failure) is characterized by the failure of the adherent, which indicates that the adhesive is stronger than the adherents and therefore typically comes with high-strength bonds. The type of macroscopic failure mode is identified by observing the adherend fracture surfaces. The methods and systems described herein may reduce failure through the joints by creating more stable and durable joints.

The techniques of the present disclosure include press fitting the shear web to one or both spar caps to keep pressure on the welding joints and reduce sensitivity to the tolerances normally seen in a wind blade bond line. Brackets may be infused into the spar caps or skins of the blade, or thermally welded in after the spar caps or skins are manufactured. These brackets may serve as an interface to weld the shear web to the spar caps. In some examples, the brackets may be V-shaped, L-shaped, or substantially planar. The brackets may be infused with carbon fiber to bond to the spar cap and shear web. During the welding process, the brackets may essentially "melt" into the shear web and/or the spar cap. That is, during the welding process the brackets may meld with the shear web and/or the spar cap to form one cohesive material.

The brackets (which also may be called flanges) may be oriented at an angle so that as the shear web is firmly fitted it also presses on the brackets, creating a good bonding surface with sufficient pressure to maintain the bond during welding. A bladder or mechanical vise may be used during the process to apply sufficient pressure to hold the bonds between the bracket(s) and spar caps and/or shear web in place for welding and to apply pressure as the bonds cool. For the leading edge and trailing edge bonds a blade tooling mold or vise may be used to apply pressure to the outside of the blade during welding.

Figure 2:
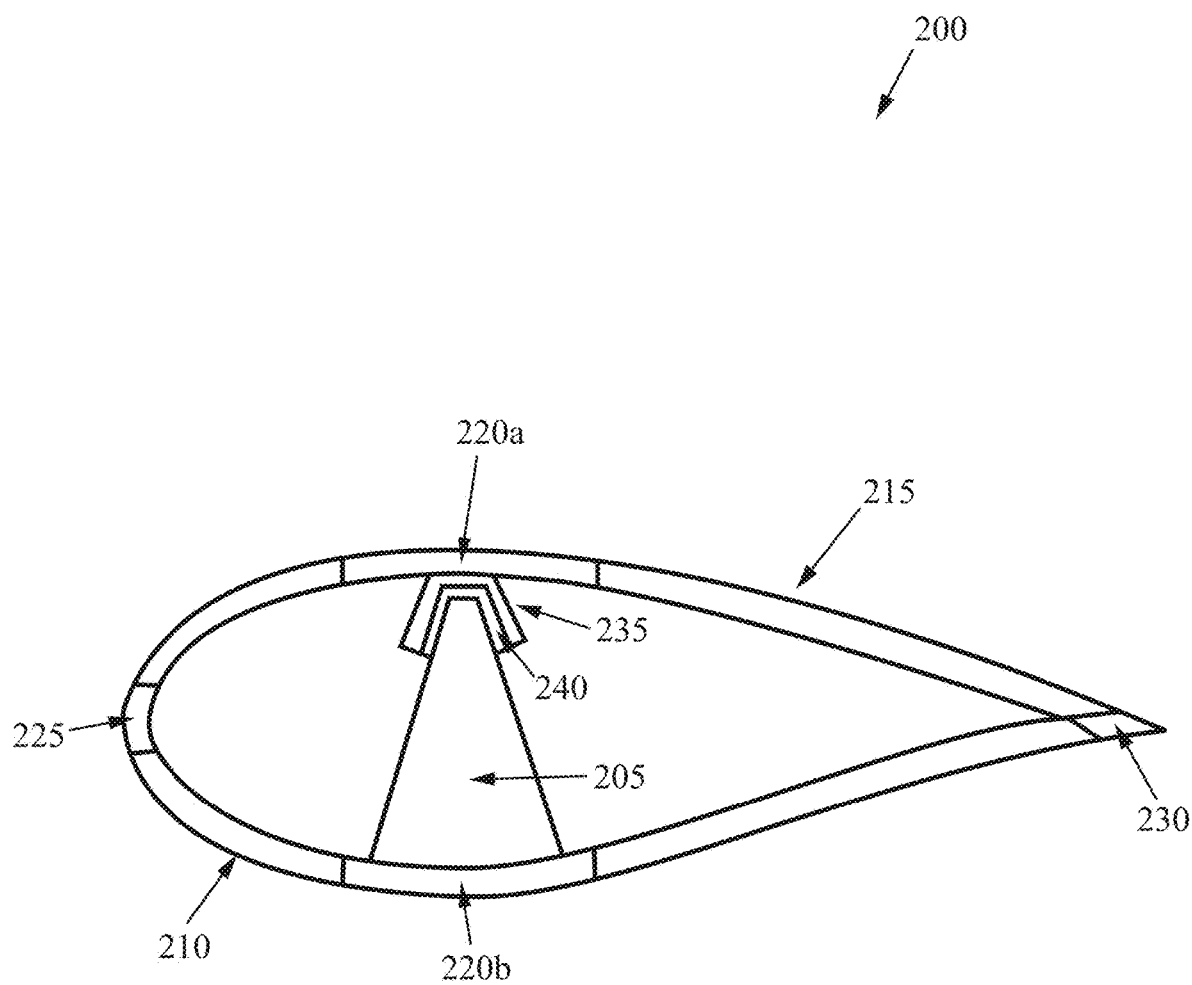
FIG. 2 illustrates a cross-section view of an example blade joint design as described herein.

The techniques of the present disclosure include using one or more brackets in the blade design to aid in the welding process. The brackets may be attached to one or both skins of the turbine and on one or either side of the shear web. The shape of the shear web may be altered based on the location(s) of the bracket(s). The shear web may be welded to the bracket(s) and/or one or more spar caps. FIG. 2 illustrates a cross-section view of an example blade joint design as described herein. The blade design 200 includes a shear web 205, a high pressure skin 210, a low pressure skin 215, an upper and lower spar cap (220a and 220b, respectively), a bracket 235, and a heating element 240. The high pressure skin 210 and low pressure 215 are joined at leading edge 225 and trailing edge 230. The blade design 200 in FIG. 2 is only one example of a blade joint as described herein. Other examples may have more, fewer, or other components.

As shown in the example of FIG. 2, the bracket 235 which extends on either side of the shear web 205. The wedge-shape of the shear web 205 allows for wide tolerances while still providing good welding ability between the bracket 235 and the shear web 205. The bracket 235 may be manufactured with upper spar cap 220a of the low-pressure skin 215 or may be attached to the upper spar cap 220a after it is manufactured. As one example, the bracket 235 may be attached to the upper spar cap 220a by welding using a heating element (not shown). The bracket 235 may be attached to the lower spar cap 220b via thermal welding using the heating element 240. That is, the surfaces where the shear web 205 and the bracket 235 meet are thermally welded together using the heating element 240.

The bracket 235 is a material that during welding will merge with the shear web 205 and the spar cap 220a, creating a solid connection between the blade components. The bracket 235 serves as a filler to provide material for creating a secure joint between the shear web 205 and the spar cap 220a. The bracket 235 is heated until it melts or flows between the shear web 205 and the spar cap 220a. Other examples may include multiple brackets performing this function between various blade components.

The heating element 240 may be a resistive heating element, an inductive heating element, or other suitable heating element. The heating element 240 is "sandwiched" between the bracket 235 and shear web 205, providing the heat necessary to bond the components. The heat provided by the heating element 240 causes the bracket 235 to melt and combine the bracket with the shear web 205. Note that another heating element (not shown) would perform the same function between the spar cap 220a and the bracket 235.

After welding the heating element 240 may remain in the bond between the shear web 205 and the upper spar cap 220a. The shear web 205 may be made of tapered foam, balsa, fiberglass, thermoplastic resin, or another similar material as needed by the bracket design. The high pressure skin 210 and low pressure skin 215 may be welded together at the leading edge 225 and trailing edge 230 using heating elements (not shown).

In some embodiments, the surface where the shear web 205 and the lower spar cap 220b meet may be thermally welded together using another heating element (not shown). In some embodiments, additional brackets may be used to connect the shear web 205 to the lower spar cap 220b (not shown). Those additional brackets may be manufactured with the lower spar cap 220b when the high pressure skin 210 is manufactured or may be attached to the lower spar cap 220b after the high pressure skin 210 is manufactured.

Figure 3:
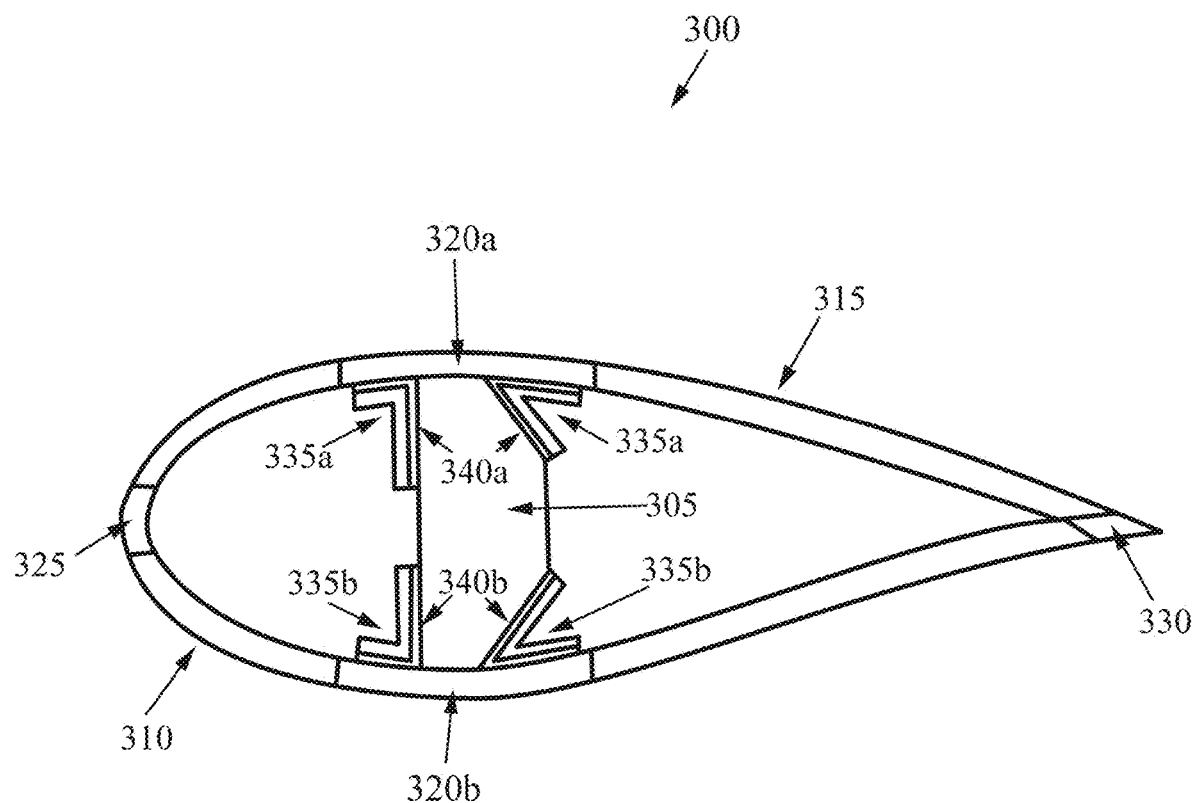
FIG. 3 illustrates a cross-section view of another example blade joint design as described herein.

Another example cross-section of a blade design is shown in FIG. 3. In the blade design 300, there is a high pressure skin 310, low pressure skin 315, upper spar cap and lower spar cap (320a and 320b, respectively), shear web 305, upper brackets 335a, lower brackets 335b, upper heating elements 340a, lower heating elements 340b, leading edge 325, and trailing edge 330. The upper spar cap and lower spar cap (320a and 320b, respectively) may be substantially similar to the upper spar cap and lower spar cap (220a and 220b, respectively) in FIG. 2. The leading edge 325 and trailing edge 330 may be substantially similar to the leading edge 225 and trailing edge 230 in FIG. 2.

As shown in FIG. 3, the upper brackets 335a and lower brackets 335b extend on either side of the shear web 305. Upper heating elements 340a are positioned between the shear web 305 and the upper brackets 335a; lower heating elements 340b are positioned between the shear web 305 and the lower brackets 335b. The upper brackets 335a connect the shear web 305 to the upper spar cap 320a via welding (which can be performed using the upper heating elements 340a). The lower brackets 335b connect the shear web 305 to the lower spar cap 320b via welding (which can be performed using the lower heating elements 340b). The brackets 335a and 335b may be either manufactured with the spar caps 320a and 320b and the high pressure skin 310 and the lower pressure skin 315 or attached to the spar caps 320a and 320b after the skins 310 and 315 are manufactured. The high pressure skin 310 and low pressure skin 315 may be welded together at the leading edge 325 and the trailing edge 330 using heating elements (not shown).

As with FIG. 2, the heating elements 340a and 340b are positioned between the shear web 305 and the brackets 335a and 335b and spar caps 320a and 320b. The heating elements 340a and 340b may be resistive heating elements, inductive heating elements, or other suitable heating elements. The heating elements 340a and 340b heat the brackets 335a and 335b, causing the brackets 335a and 335b to essentially "melt" into the shear web 305 and the spar caps 320a and 320b, creating bonds.

As described herein, thermoplastic resins may be used in place of traditional thermoset resins to make the components of the blades. Thermoplastic resins cure at room temperature, are easily recyclable, and have significantly decreased cycle times compared to thermoset resins, all of which could lead to lower manufacturing costs. Thermoplastic resins may also be used for fusion welding, which would eliminate at least some adhesive bonds between blade components and may increase the overall strength and reliability of the blades.

Fusion (or thermal) welding takes advantage of the property of thermoplastic matrices to flow when heated above their glass transition temperature and then return to their baseline mechanical properties upon cooling down. The glass transition temperature is the temperature range in which a material changes from a hard state to a more pliable, compliant state. This facilitates the joining of two parts by fusing their contacting surfaces when heated. Subsequent cooling of the bond under pressure results in the polymeric chains entangling to form a strong bond of the two components.

Fusion welding of a thermoplastic wind turbine blade is performed by focusing heat and pressure at the location of a joint within the blade, that is, performing localized heating to fuse the two contacting surfaces without heating the entire blade. Heating the entire blade could result in undesired consequences, such as change in shape of the blade or fiber disturbances in the laminates of the skins. There are many methods to apply heat to a joint, including, but not limited to, mechanical motion resulting in friction melting, electric-resistance heating, ultrasonic, microwave, and induction heating.

Resistance heating is one method for achieving the temperature needed for fusion welding. Resistance welding of thermoplastic components involves applying a current to heat an electrically conducting heating element implanted between two adherend surfaces, with pressure applied for consolidation. This may be done by sandwiching a conductive material (i.e., a heating element), such as a metal mesh or carbon fiber, between two blade components (such as the shear web and a bracket), while the conductive material is connected to a power source. A schematic of the process of resistance welding is shown in FIG. 4.

Figure 4:
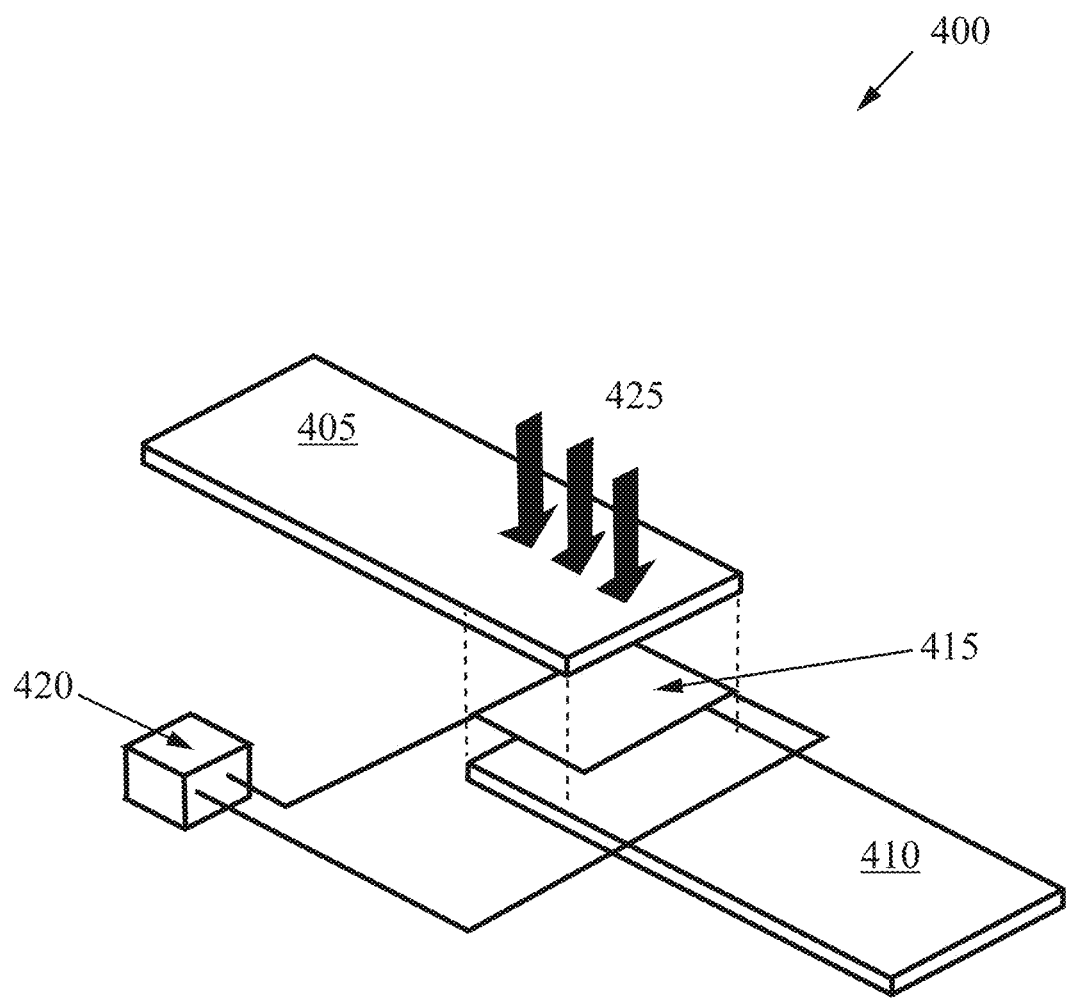
FIG. 4 illustrates resistance welding as described herein.

FIG. 4 illustrates the concept of resistance welding as used in some embodiments herein. The resistance welding system 400 shown in FIG. 4 includes a first material 405 and a second material 410 which have a certain amount of overlap. Positioned in the overlap is a heating element 415 which is connected to a power source 420. The first material 405 and second material 410 may be any two components in the blade designs in FIGS. 2 and 3. For example, the shear web of FIG. 2 or 3 may serve as the first material 410 and a bracket of FIG. 2 or 3 may serve as the second material. The heating element 415 is configured to be positioned between the first material 405 and second material 410.

In the resistance welding system 400 shown in FIG. 4, the power source 420 is configured to supply power to the heating element 415. A pressure 425 is configured to be applied to the first material 405, keeping the heating element 415 "sandwiched" between the first material 405 and the second material 410. After the heating element 415 has sufficiently heated the first material 405 and the second material 410, the power is turned off, and the pressure 425 is continued. The pressure 425 is maintained until the bond line has cooled, meaning the overlap between the first material 405 and the second material 410 has been welded such that it forms a single, continuous material. For example, when the shear web of FIG. 2 or 3 is joined using resistance welding to a bracket of FIG. 2 or 3, a heating element is positioned between the shear web and the bracket and pressure is applied to the three components while the heating element is activated.

When current flows through the heating element 415, the heat generated follow's Joule's Law (meaning the energy dissipated from the heating element (or resistor) is proportional to the resistance, current, and elapsed time). Once sufficient melting of the components has been achieved, the current may be turned off and the bond is allowed to cool while pressure 425 is continued to be applied. The pressure 425 may be removed when the materials have cooled, meaning the adhesion is set and the components are welded together to form a cohesive bond. The benefits of resistance welding include low-cost equipment and easy operation, mainly attributed to the relatively simple relationship between the current and heat. As resistance welding requires the heating element be left in the bond line, the material of the heating element must be selected carefully so as to not impact the wind turbine blade's future performance. Resistance welding may be performed over the entirety of the blade, or the blade may be broken into sections which may be sequentially welded.

Figure 5:
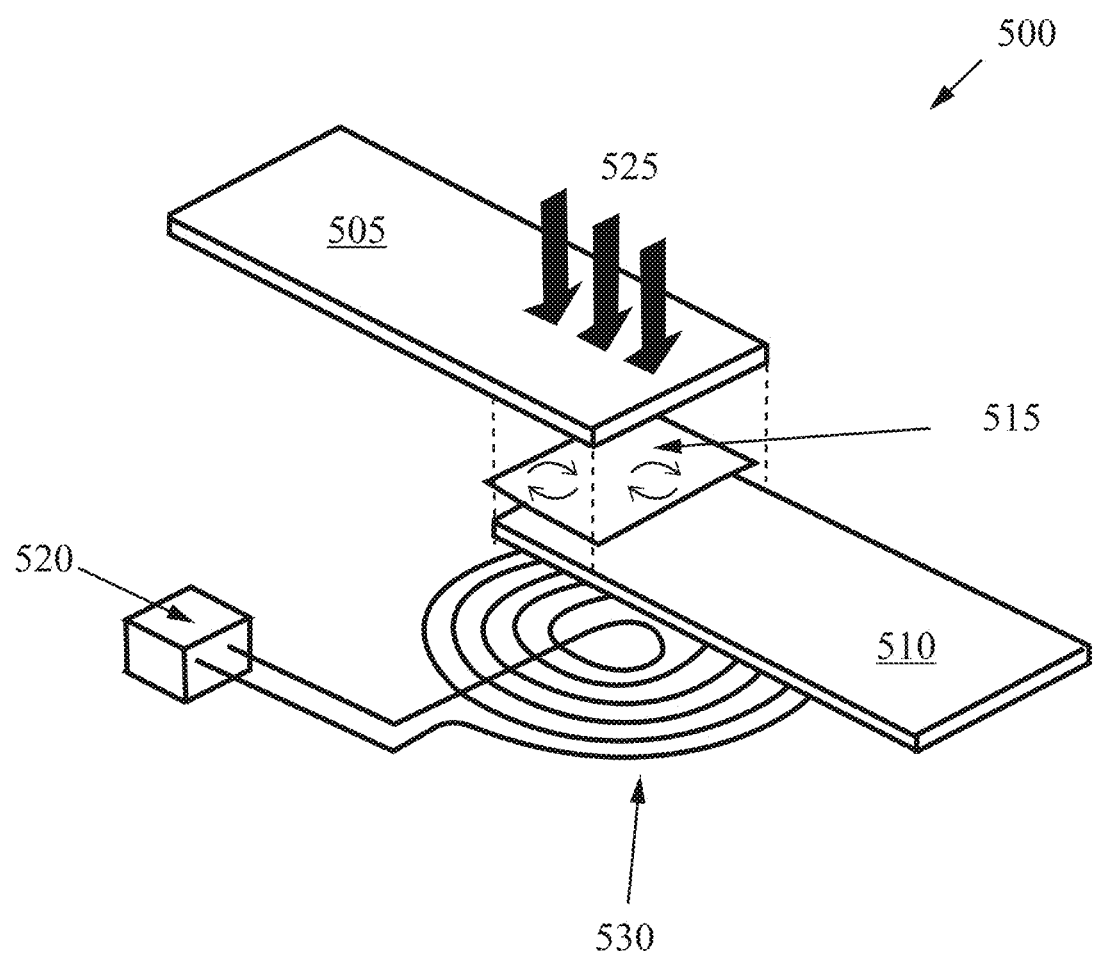
FIG. 5 illustrates induction welding as described herein.

A schematic of induction welding is shown in FIG. 5. As shown in FIG. 5, an induction-welded system 500 includes a first material 505 and a second material 510 which have a certain amount of overlap. Positioned in the overlap is a magnetically susceptible heating element 515. Using a coil 530 connected to a power source 520, a magnetic field (not shown) is produced, which heats the heating element 515. A pressure 515 is applied to the first material 505, keeping the heating element 515 "sandwiched" between the first material 505 and the second material 510. The magnetic field stimulates eddy currents and heats the implant. The eddy currents are resisted by the heating element material that results in the application of pressure to consolidate the materials. After the magnetic field has sufficiently heated the first material 505 and the second material 510, the power is turned off, and the pressure 525 is continued. The pressure 525 is maintained until the bond line has cooled, meaning the overlap between the first material 505 and the second material 510 has been welded such that it forms a single, continuous material.

Resistance heating provides an efficient path for rapidly increasing the temperature (~200 C) to achieve the conditions required for fusion joining. In some embodiments, the heating element can be a thin metal mesh. In other embodiments, which may work best for wind turbine blades, the heating element may be a thin (e.g., 600 µm) carbon fiber heating element. The carbon film not only allows electrical current for resistive heating, but it also provides additional mechanical strength to the wind blade joint while not introducing any "foreign" materials into the wind blade structure. For resistive heat welding, the application of the power to the blade bond line and control of the bond line temperatures is also important to the success of the welding process.

Induction welding requires little to no contact between the induction coil and the heating element and can be designed such that only the interface materials are affected by the magnetic field, meaning no heat is released or produced outside of the desired weld area. This makes it a relatively low-energy consumption process because only the susceptor and interface materials heat up. In a wind turbine blade, the thickness of the laminates through which the susceptor needs to be heated changes over the blade length due to ply drops in the spar cap. This makes accurately controlling the coil distance important. In some aspect of the present disclosure, when induction heating is used, to control the bonding temperature, "smart" susceptor materials are used such that the Curie point (the temperature at which a magnetic material becomes nonmagnetic) is just above the glass transition temperature of the resin. This may result in leveling of the susceptor temperature independent of the applied power (because temperature plateaus at a predetermined point).

Thermal welding of a thermoplastic resin requires pressure to be maintained while the bond cools, solidifying the connection. This pressure may be applied using a bladder, blade molding, or mechanical vise to hold the components together while the bond cools. For both induction welding and resistance welding, the presence of the heating element in the bond line after the weld is complete allows for reprocessing if there is incomplete bonding or damage to the blade in the field.

Fusion welding results in stronger bonds than adhesives for small-scale coupons. The techniques described herein provide mature fusion welding technology to a scale compatible with utility-size wind turbine blades so that it is commercially viable for the wind industry. The commercialization of fusion joining for wind turbine blades could replace the use of thermoset resins which would decrease the blade capital costs and increase the annual wind energy production by enabling more efficient longer blades. This, in turn, may lead to improvements in the performance and reliability of wind blades, which will result in improved dependability of the overall wind plant.

The present disclosure also focuses on manufacturing processes which are less energy intensive than traditional wind turbine blade manufacture. The manufacturing processes described herein may be used in industries outside of the wind industry. These include industries such as automotive, marine, buildings, aerospace, pipe and tanks, transpiration, and infrastructure. The techniques described herein may provide cost-effective technologies for process heating that improve the properties of manufactured products because fusion joining creates stronger composite structures and eliminates the need for high-temperature oven-curing of adhesively joined composite structures, which significantly reduces the energy requirements for manufacturing. Current composite joining methods require significant amount of energy and place the part into a high temperature oven to cure the thermoset. The approached detailed herein eliminates this labor and energy intensive step.

Fusion welding a utility-scale wind turbine blade requires careful design of the blade joints and specialized systems for pressure application and temperature measurement to ensure uniform joining of the components. One solution for pressure application may involve the use of a bladder inside the blade cavity. A bladder may be a container configured to hold air, nitrogen, or another gas that can be filled/inflated with the gas to apply pressure on the joints to be welded within a turbine blade. A bladder may be made of rubber, plastic, latex, or another flexible material. After the welded joint has cooled the bladder may be deflated and may be removed from the interior of the turbine blade. A single bladder may be reused for multiple joints being thermally welded together.

Figure 6:
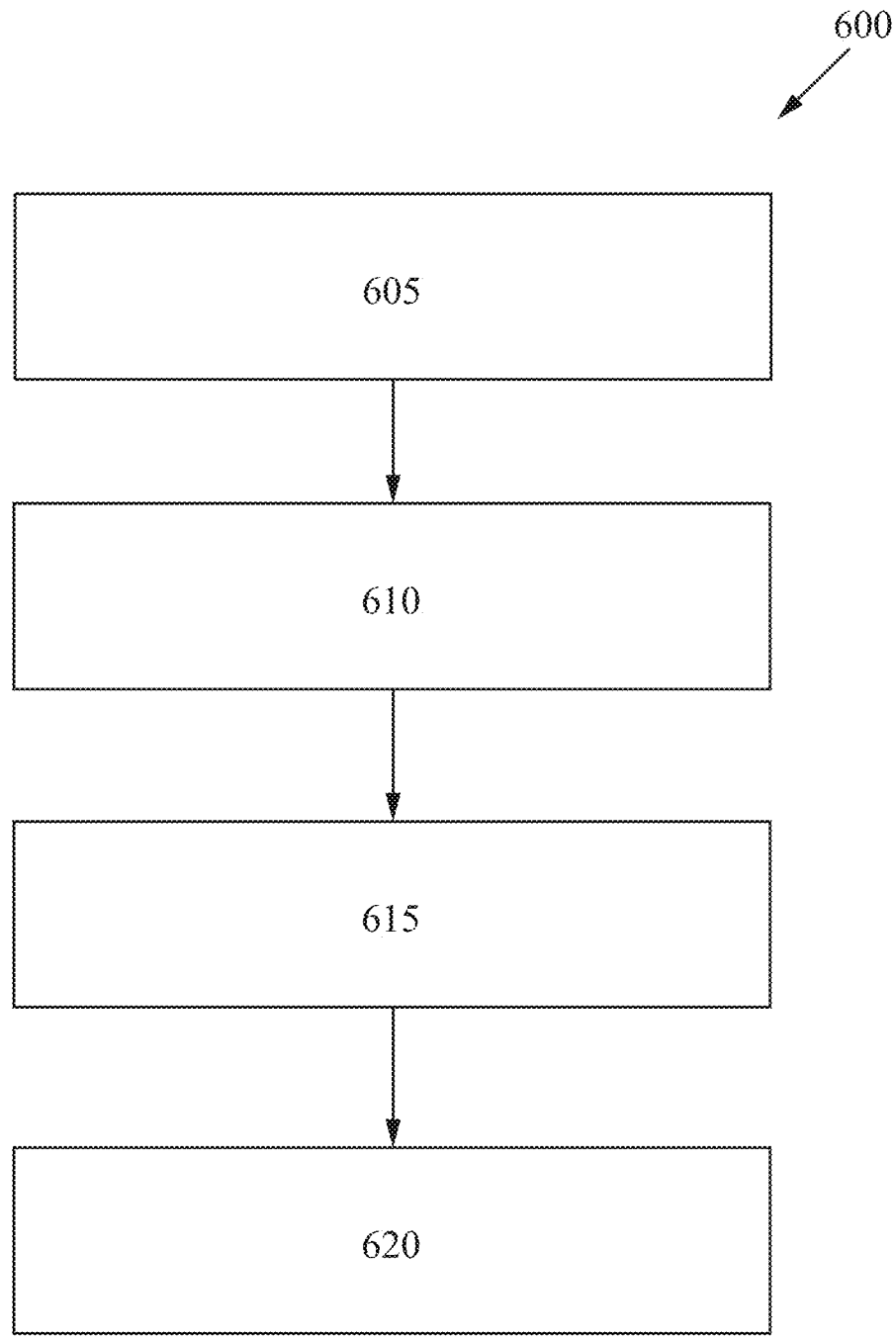
FIG. 6 is a flowchart showing a method of manufacturing wind turbine blades as described herein.

FIG. 6 is a flowchart showing a method of manufacturing wind turbine blades as described herein. The method 600 includes first assembling the wind turbine blade 605. This assembling 605 may include putting the blade components into position. The components may include (but not be limited to): blade skins (with spar caps), at least one shear web, heating elements, and multiple brackets. The brackets will be placed at locations where a shear web and a spar cap are to be joined. The heating elements will be positioned between the brackets and the shear web and/or between the brackets and the spar cap.

Next, as shown in FIG. 6, the method 600 includes applying pressure to the locations to be joined 610. The locations to be joined may be referred to as bonds. The pressure may be applied using a bladder within the skins and/or a mechanical vise outside of the skins. The pressure may hold the components into the final locations.

Third, as shown in FIG. 6, the method 600 includes activating the heating elements 615. If the heating elements are to be used for resistance welding, the activating 615 may include an routing an electrical current through the heating elements. If the heating elements are to be used for induction welding, the activating 615 may include providing a coil hear the blade to create a magnetic field.

Fourth, as shown in FIG. 6, the method 600 includes cooling the blade while maintaining pressure on the bonds 620. The cooling 620 may be done using a mechanical means (such as a fan or other cooling device) or may be done by simply allowing the bonds to come to ambient temperature over time. During the cooling, the pressure is continued to allow the bonds to firmly set. When the bonds have cooled the pressure may be removed and the blade may be deemed ready for use.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

The invention claimed is:

1. A system comprising:
a first wind turbine blade skin having a first spar cap;
a shear web;
a first heating element and a second heating element;
a first flange; and
a bladder; wherein:
the first spar cap, the shear web, and the first flange are comprised of a thermoplastic resin,
the first heating element is positioned between the first flange and the shear web,
the second heating element is positioned between the first flange and the first spar cap,
the first heating element is configured to thermally weld the first flange to the shear web, with the first heating element being thermally welded in between the first flange and the shear web,
the second heating element is configured to thermally weld the first flange to the first spar cap with the second heating element thermally welded in between the first flange and the first spar cap.

2. The system of claim 1, further comprising:
a second wind turbine blade skin having a second spar cap;
a third heating element and a fourth heating element; and
a second flange; wherein:
the third heating element is positioned between the second flange and the shear web,
the fourth heating element is positioned between the second flange and the second spar cap, and
a pressure is applied to the second flange.

3. The system of claim 2, wherein:
the second flange is configured to be welded to the shear web with the third heating element thermally welded in between the second flange and the shear web, and
the second flange is configured to be welded to the second spar cap with the fourth heating element thermally welded in between the second flange and the second spar cap.

4. A method comprising:
assembling a wind turbine blade; the blade comprising:
a first skin having a first spar cap,
a second skin having a second spar cap,
a shear web positioned between the first spar cap and the second spar cap,
a first flange, positioned with the first flange in contact with the shear web, and the first flange in contact with the first spar cap,
a second flange, positioned with the second flange in contact with the shear web, and the second flange in contact with the second spar cap, and
a plurality of heating elements positioned between the first flange and the shear web, between the first flange and the first spar cap, between the second flange and the shear web, and between the second flange and the second spar cap,
applying a pressure to the first flange, the second flange, the shear web, the first spar cap, and the second spar cap;
activating the plurality of heating elements; and
cooling the wind turbine blade while maintaining the pressure.

5. The method of claim 4, wherein the applying a pressure is performed using a bladder positioned within the wind turbine blade.

6. The method of claim 4, wherein the first spar cap, the second spar cap, the shear web, the first flange, and the second flange are comprised of thermoplastic resin.

7. The method of claim 4, wherein the plurality of heating elements comprise conductive cables which are connected to a power source.

8. The method of claim 7, wherein the activating the plurality of heating elements comprises turning on the power source so electrical energy flows through the heating elements.

9. The method of claim 4, wherein the plurality of heating elements are magnetically susceptible.

10. The method of claim 9, wherein the activating the plurality of heating elements comprises using a coil to produce a magnetic field which stimulates the plurality of heating elements.

* * * * *